United States Patent
Hu et al.

(10) Patent No.: US 8,982,521 B2
(45) Date of Patent: Mar. 17, 2015

(54) OVERVOLTAGE PROTECTION METHOD FOR BACKLIGHT DRIVER

(71) Applicant: Shenzhen China Star Optoelectronics Technology Co., Ltd., Shenzhen, Guangdong (CN)

(72) Inventors: Anle Hu, Shenzhen (CN); Fei Li, Shenzhen (CN)

(73) Assignees: Shenzhen China Star, Shenzhen, Guangdong (CN); Optoelectronics Technology co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/985,916

(22) PCT Filed: Feb. 6, 2013

(86) PCT No.: PCT/CN2013/071470
§ 371 (c)(1),
(2) Date: Aug. 16, 2013

(87) PCT Pub. No.: WO2014/110850
PCT Pub. Date: Jul. 24, 2014

(65) Prior Publication Data
US 2014/0204492 A1    Jul. 24, 2014

(51) Int. Cl.
*H02H 3/20* (2006.01)
*G09G 5/00* (2006.01)
*H05B 37/02* (2006.01)
*H02H 9/04* (2006.01)

(52) U.S. Cl.
CPC ..................... *H02H 9/04* (2013.01)
USPC ............... 361/91.1; 345/212; 315/308

(58) Field of Classification Search
USPC ............... 361/91.1; 345/212; 315/308
See application file for complete search history.

(56) References Cited

U.S. PATENT DOCUMENTS

| | | | |
|---|---|---|---|
| 2005/0110469 A1* | 5/2005 | Inaba et al. | 323/222 |
| 2009/0009508 A1 | 1/2009 | Koo et al. | |
| 2009/0302776 A1* | 12/2009 | Szczeszynski | 315/246 |
| 2010/0141633 A1* | 6/2010 | Goder | 345/212 |
| 2012/0049740 A1 | 3/2012 | Kang et al. | |
| 2012/0181950 A1* | 7/2012 | Yu et al. | 315/294 |

(Continued)

FOREIGN PATENT DOCUMENTS

| | | |
|---|---|---|
| CN | 201680231 U | 12/2010 |
| CN | 101944331 A | 1/2011 |

(Continued)

*Primary Examiner* — Scott Bauer
(74) *Attorney, Agent, or Firm* — Andrew C. Cheng

(57) ABSTRACT

An overvoltage protection method for backlight driver includes: providing an LCD device having 2D and 3D modes, comprising a backlight driver comprising a constant current supplying chip and a dimming control coupled to the constant current supplying chip, the constant current supply chip applying a first overvoltage protection level and a second overvoltage protection level as a overvoltage protection level; detecting a signal of the dimming control by using the constant current flow supplying chip, and applying the first overvoltage protection level as the overvoltage protection level based on the signal of the dimming control when the LCD device is in the 2D mode; and detecting the signal of the dimming control by using the constant current flow supplying chip, and applying the second overvoltage protection level as the overvoltage protection level based on the signal of the dimming control when the LCD device is in the 3D mode.

11 Claims, 3 Drawing Sheets

(56) References Cited

U.S. PATENT DOCUMENTS

2012/0212205 A1* 8/2012 Yamada .................. 323/284
2013/0271701 A1* 10/2013 Yang et al. ................ 349/69

FOREIGN PATENT DOCUMENTS

CN 102610200 A 7/2012
CN 102881262 A 1/2013

* cited by examiner

OVERVOLTAGE PROTECTION METHOD FOR BACKLIGHT DRIVER

BACKGROUND OF THE INVENTION

1. Field of the Invention

The present invention relates to liquid crystal display device field, in particular, to a method for driving an LED backlight source in a liquid crystal display device.

2. Description of the Prior Art

A liquid crystal display (LCD) presenting advantages over thinness, low power consumption and non-radiation, is widely used. Most LCDs in present market are backlight type LCDs, comprised of liquid crystal panel and backlight module. The liquid crystal panel has liquid crystal molecules between two paralleling glass substrates. Light from the backlight module is refracted depending on an alignment of the liquid crystal molecules controlled by voltage drop between the two glass substrates through many vertical and horizontal tiny wires thereon, thereby displaying images. The backlight module is one of the key components of LCD device, because normal display of image is provided by light from the backlight module, for the liquid crystal panel does not illuminate itself. According to light incident position, the backlight modules are classified as side-in type and direct-in type. The direct-in type backlight module emits light to the liquid crystal panel by forming surface light source through setting up the light sources such as Cold Cathode Fluorescent Lamps (CCFLs) or Light Emitting Diodes (LEDs) in the rear of the liquid crystal panel. The side-in type backlight module emits light to the liquid crystal panel by forming surface light source through setting up backlight LED lightbars on the bezel fringe in the side rear of liquid crystal panel. The surface light source is generated in the process in which the light from the LED lightbars is incident to a light-in surface of a Light Guide Plate (LGP) and departs from a light-out surface of the LGP after reflection and refraction, and optical films.

Please refer to FIG. 1 illustrating a circuit diagram of an LED backlight driving circuit for use in an LCD having 2D and 3D modes. A constant current supplying chip IC (constant current supplying chip) 300 has an OVP (output overvoltage protection) pin, in which a voltage comparator 200 having resistors R100 and 8200 in series divides voltage for driving LED series circuit. When voltage applied on the resistor 8200 is higher than internal constant voltage source (generally 2V) in constant current supplying chip IC 300, the constant current supplying chip IC 300 turns off a field effect transistor (FET) Q100, as a consequence output voltage (i.e. driving voltage for LED series circuit 100) stops rising, so as to protect components of the backlight driving circuit from burning out. Current flowing over LED series circuit 100 varies linearly with voltage needed. As to LCD having 2D and 3D mode, the peak value of backlight LED driving current under 3D mode is higher, and voltage needed is correspondingly higher. Calculating on basis of 8 LEDs in a LED series circuit, voltage needed under 3D mode is 10V higher than that under 2D mode, henceforth, the overvoltage protection point is determined as 1.2 times of driving voltage needed of LED series circuit under 3D mode. If the overvoltage protection point is determined by driving voltage needed of the LED series circuit 100 under 2D mode, the LED series circuit under 3D mode may be short of driving voltage to illuminate normally.

However, determining the overvoltage protection point by driving voltage of LED series circuit 100 under 3D mode is technically defective as described below: when overvoltage protection is triggered by some unusual causes, if output voltage of driving circuit rises too high, the overall power will augment abruptly, largely affecting the components of the driving circuit (such as fuse melting), and reducing a lifetime of a convertor in the circuit (such as transformers).

SUMMARY OF THE INVENTION

An object of the present invention is to provide an overvoltage protection method for backlight driver, which sets up voltage levels of overvoltage protection separately under 2D and 3D modes, thereby lower overvoltage protection level under 2D mode, to prevent abrupt power augment in the circuit due to unusual causes under 2D mode, and to prolong lifetime of components in circuit such as transformers.

According to the present invention, an overvoltage protection method for a backlight driver, comprises following steps:

Step 100: providing a liquid crystal display (LCD) device having 2D and 3D modes, comprising a backlight driver comprising a constant current supplying chip and a dimming control coupled to the constant current supplying chip, the constant current supply chip applying a first overvoltage protection level and a second overvoltage protection level as a overvoltage protection level, and the second overvoltage protection level being higher than the first overvoltage protection level;

Step 200: detecting a signal of the dimming control by using the constant current flow supplying chip, and applying the first overvoltage protection level as the overvoltage protection level of the backlight driver based on the signal of the dimming control when the LCD device is working in the 2D mode; and Step 300: detecting the signal of the dimming control by using the constant current flow supplying chip, and applying the second overvoltage protection level as the overvoltage protection level of the backlight driver based on the signal of the dimming control when the LCD device is working in the 3D mode.

Furthermore, the backlight driver further comprises: a power module, an inductance coupled to the power module, a voltage dividing module, a rectifying diode coupled between the inductance and the voltage dividing module, a light emitting diode (LED) series circuit coupled to the rectifying diode, a first field effect transistor (FET) coupled to the inductance, a first resistor coupled to the first FET, a second FET coupled to the LED series circuit, and a control source coupled to the second FET, the second FET, the voltage dividing module and the first resistor are all coupled to ground, and the constant current supplying chip is coupled to the voltage dividing module.

Furthermore, the voltage dividing module comprises a second resistor and a third resistor series-connected, and the constant current supplying chip is coupled to a common end of the second and the third resistor.

Furthermore, the first FET comprises a first gate coupled to the constant flow supplying chip, a first drain coupled to the inductance, and a first source coupled to the first resistor.

Furthermore, the second FET comprises a second gate coupled to the control source, a second drain coupled to the LED series circuit, and a second source coupled to the ground.

Furthermore, the constant flow supplying chip comprises a first pin coupled to the first gate of the first FET, a second pin coupled to a common end of the second and third resistors and a third pin coupled to the dimming control.

Furthermore, the constant flow supplying chip comprises a protection module coupled to the first pin, a first switch, a second switch, a first reference voltage, a second reference voltage and a voltage comparator coupled to the protection module, the voltage comparator comprises a fourth pin coupled to the protection module, a fifth pin coupled to the second pin, a sixth pin coupled to the first reference voltage via the first switch, and a seventh pin coupled to the second reference voltage via the second switch.

Furthermore, the first switch turns on while the second switch turns off when the signal of dimming control is at a low voltage level, and the first switch turns off while the second switch turns on when the signal of dimming control is at a high voltage level.

Furthermore, the first reference voltage is lower than the second reference voltage.

Furthermore, the first reference voltage is 1.5V, and the second reference voltage is 2V.

According to the present invention, an overvoltage protection method for backlight driver, comprises following steps:

Step 100: providing a liquid crystal display (LCD) device having 2D and 3D modes, comprising a backlight driver comprising a constant current supplying chip and a dimming control coupled to the constant current supplying chip, the constant current supply chip applying a first overvoltage protection level and a second overvoltage protection level as a overvoltage protection level, and the second overvoltage protection level being higher than the first overvoltage protection level;

Step 200: detecting a signal of the dimming control by using the constant current flow supplying chip, and applying the first overvoltage protection level as the overvoltage protection level of the backlight driver based on the signal of the dimming control when the LCD device is working in the 2D mode; and Step 300: detecting the signal of the dimming control by using the constant current flow supplying chip, and applying the second overvoltage protection level as the overvoltage protection level of the backlight driver based on the signal of the dimming control when the LCD device is working in the 3D mode;

wherein the backlight driver further comprises: a power module, an inductance coupled to the power module, a voltage dividing module, a rectifying diode coupled between the inductance and the voltage dividing module, a light emitting diode (LED) series circuit coupled to the rectifying diode, a first field effect transistor (FET) coupled to the inductance, a first resistor coupled to the first FET, a second FET coupled to the LED series circuit, and a control source coupled to the second FET, the second FET, the voltage dividing module and the first resistor are all coupled to ground, and the constant current supplying chip is coupled to the voltage dividing module;

wherein the voltage dividing module comprises a second resistor and a third resistor series-connected, and the constant current supplying chip is coupled to a common end of the second and the third resistor;

wherein the first FET comprises a first gate coupled to the constant flow supplying chip, a first drain coupled to the inductance, and a first source coupled to the first resistor;

wherein the second FET comprises a second gate coupled to the control source, a second drain coupled to the LED series circuit, and a second source coupled to the ground;

wherein the constant flow supplying chip comprises a first pin coupled to the first gate of the first FET, a second pin coupled to a common end of the second and third resistors and a third pin coupled to the dimming control;

wherein the constant flow supplying chip comprises a protection module coupled to the first pin, a first switch, a second switch, a first reference voltage, a second reference voltage and a voltage comparator coupled to the protection module, the voltage comparator comprises a fourth pin coupled to the protection module, a fifth pin coupled to the second pin, a sixth pin coupled to the first reference voltage via the first switch, and a seventh pin coupled to the second reference voltage via the second switch;

wherein the first switch turns on while the second switch turns off when the signal of dimming control is at a low voltage level, and the first switch turns off while the second switch turns on when the signal of dimming control is at a high voltage level;

wherein the first reference voltage is lower than the second reference voltage; and wherein the first reference voltage is 1.5V, and the second reference voltage is 2V.

A benefit of the present invention is described as below: by detecting signals of dimming control to conduct different reference voltage to compare voltage, this overvoltage protection method of backlight driver succeeds in setting up different overvoltage protection levels under 2D and 3D mode, thereby lowers overvoltage protection level under 2D mode, thus avoiding abrupt power augment in the 2D mode under unusual condition, so as to prolong lifetime of components in circuit such as transformers.

These and other objectives of the claimed invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the invention, and are incorporated in and constitute a part of this specification.

DETAILED DESCRIPTION OF THE PREFERRED EMBODIMENTS

The drawings illustrate embodiments of the invention and, together with the description, serve to explain the principles of the invention.

Figure 1:
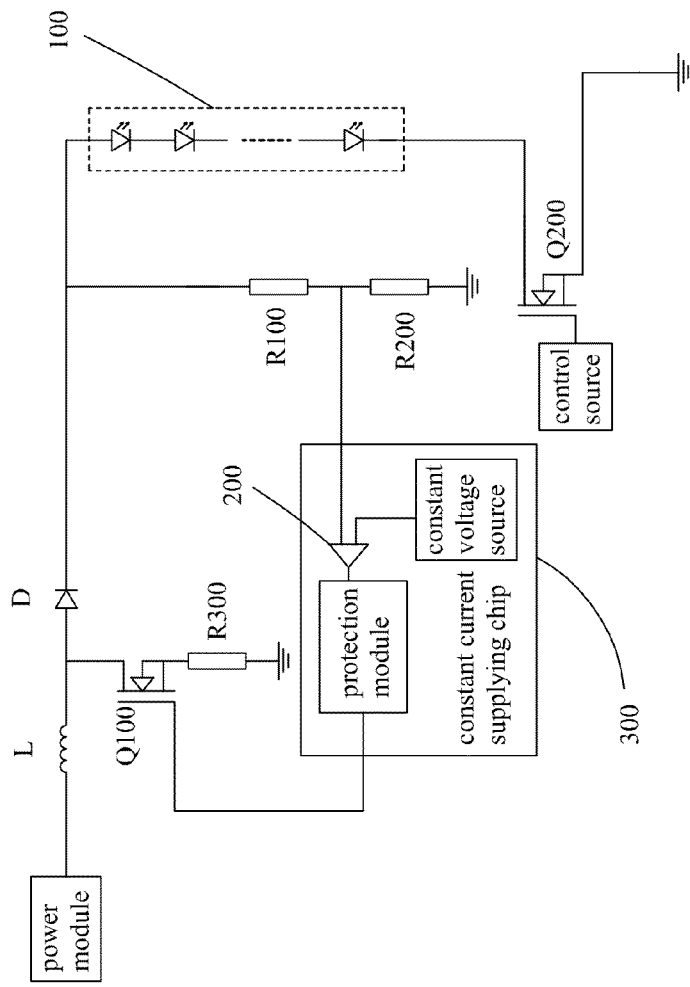
FIG. 1 illustrates a circuit diagram of a conventional backlight driver.
Figure 2:
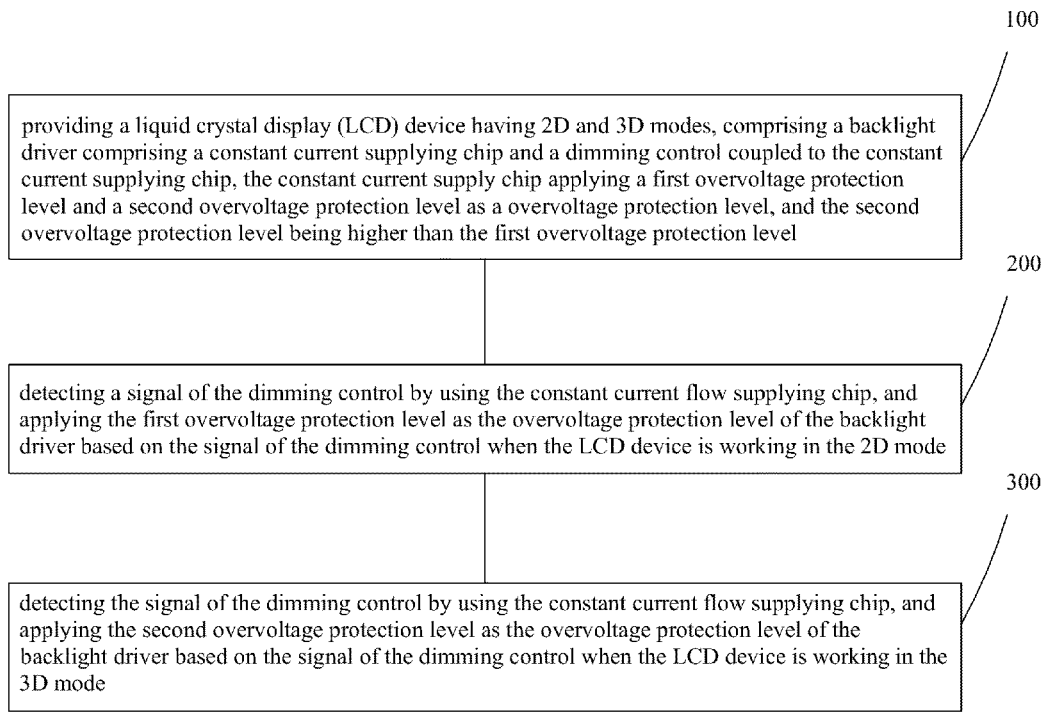
FIG. 2 illustrates a flowchart of an overvoltage protection method of a backlight driver according to a preferred embodiment of the present invention.
Figure 3:
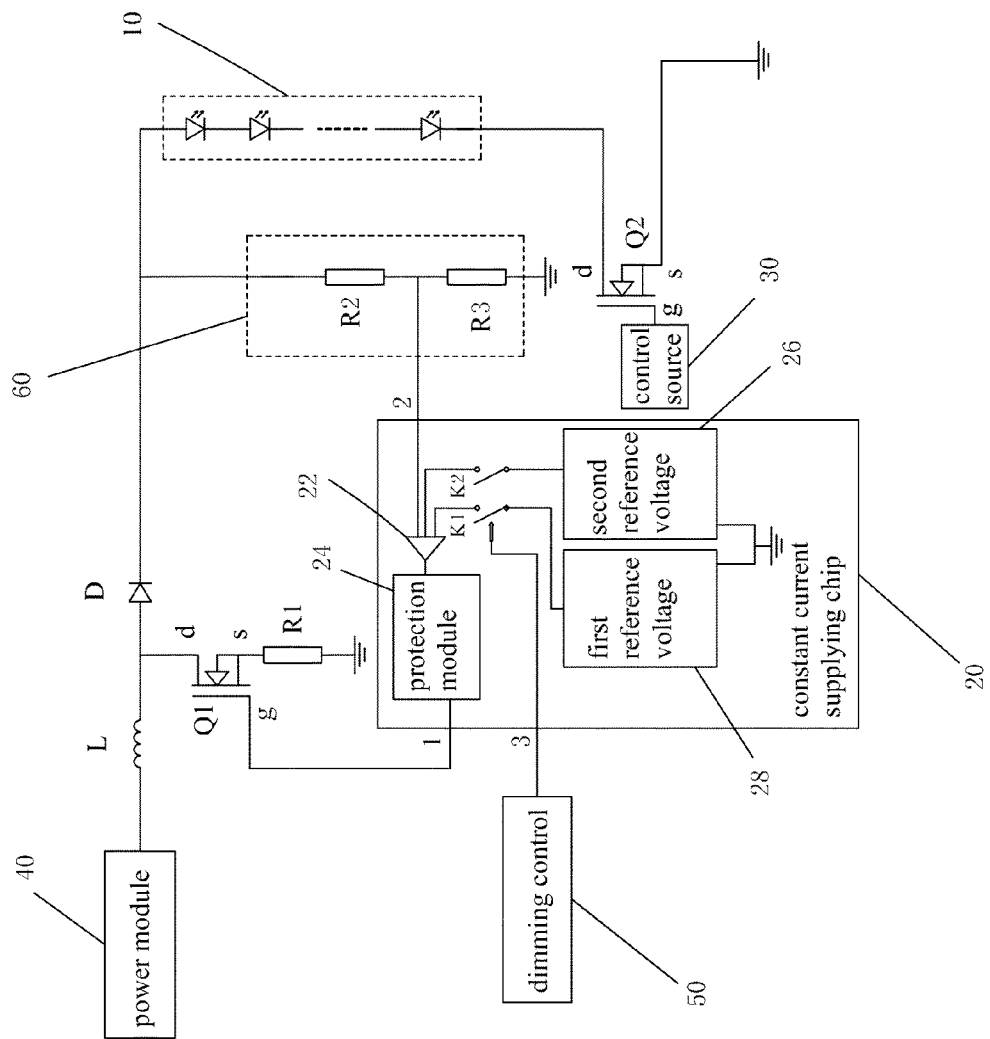
FIG. 3 illustrates a circuit diagram of a backlight driver using the overvoltage protection method according to a preferred embodiment of the present invention.

Please refer to FIG. 2 and FIG. 3. The present invention provides an overvoltage protection method of backlight driver comprises the following steps:

Step 100: Provide a LCD device (not shown) having 2D and 3D modes. A backlight driver comprising a constant current supplying chip 20 and a dimming control 50 coupled to the constant current supplying chip 20. The constant current supplying chip 20 applies a first overvoltage protection level and a second overvoltage protection level as overvoltage protection level, and the second overvoltage protection level is higher than the first overvoltage protection level.

The backlight driver also comprises: a power module 40, an inductance L coupled to the power module 40, a voltage dividing module 60, a rectifying diode D coupled between the inductance L and the voltage dividing module 60, an LED series circuit 10 coupled to the rectifying diode D, a first field effect transistor (FET) Q1 coupled to the inductance L, a first resistor R1 coupled to the first FET Q1, a second FET Q2 coupled to the LED series circuit 10 and a control source 30 coupled to the second FET Q2. The second FET Q2, the voltage dividing module 60 and the first resistor R1 are all coupled to ground, and constant current supplying chip 20 is coupled to the voltage dividing module 60. The inductance L is used to filter, in order to prevent current spike. The rectifying diode D rectifies current due to its one-way conductivity.

The voltage dividing module 60 comprises a second resistor R2 and a third resistor R3 in series connection, a constant current supplying chip 20, which is coupled to a common end of the resistors R2 and R3. The constant current supplying chip 20 collects voltage from both ends of the resistor R3 to conduct overvoltage protection.

The first FET Q1 comprises a first gate g coupled to the constant flow supplying chip 20, a first drain d coupled to a common end of the inductance L and the rectifying diode D, and a first source s coupled to the first resistor R1. The constant flow supplying chip 20 controls conductivity of the first FET Q1 under overvoltage driving condition, thereby conducts overvoltage protection of the LED series circuit 10. The second FET Q2 comprises a second gate g coupled to the control source 30, a second drain d coupled to the LED series circuit 10, and a second source s coupled to ground. The control source 30 controls luminance of the whole LED series circuit 10 by the second FET Q2.

The constant flow supplying chip 20 has a first pin 1 coupled to the first gate g of the first FET Q1, a second pin 2 coupled to a common end of the second and third resistor R2 and R3, a third pin coupled to the dimming control 50. The constant flow supplying chip comprises a protection module 24, a first switch K1, a second switch K2, a first reference voltage 28, a second reference voltage 26 and a voltage comparator 22 coupled to the protection module 24. The voltage comparator 22 has a fourth pin (not shown) coupled to protection module 24, a fifth pin (not shown) coupled to the second pin 2, a sixth pin (not shown) coupled to the first reference voltage 28 via the first switch K1, a seventh pin (not shown) coupled to the second reference voltage 26 via the second switch K2. The protection module 24 is coupled to the first pin 1. The reference voltage 28 is lower than the second reference voltage 26. In the preferred embodiment, the reference voltage 28 is 1.5V, and the reference voltage 26 is 2V.

Signal of the dimming control 50 controls on/off state of the first and second switches K1 and K2. The dimming control 50 is in low voltage level in 2D mode and in high voltage level in 3D mode. When signal of dimming control 50 is at low voltage level, the first switch K1 should be turned on, the second switch K2 should be turned off. Likewise, when signal of dimming control 50 is at high voltage level, the first switch K1 should be turned on, the second switch K2 should be turned off.

Step 200, when the LCD device is working in 2D mode, the constant current flow supplying chip 20 detects signal of the dimming control 50, and applies the first overvoltage protection level as overvoltage protection level of the backlight driving diagram according to this signal.

When the LCD device is working in 2D mode, the dimming control 50 is in low voltage level control. At this moment, the first switch K1 turns on in response to the low voltage level signal of this dimming control (while the second switch K2 keeps turning off). The sixth pin of the voltage comparator 22 conducts and the seventh pin disconnects, thereby setting the first reference voltage 28 (1.5V) as reference voltage. The constant current flow supplying chip 20 collects voltage across the third resistor R3. When the voltage across the third resistor R3 is too high (i.e. overvoltage), the voltage comparator 22 turns off the first FET Q1 through the protection module 24, forcing the driving voltage of LED series circuit 10 to lower, thereby to protect.

Step 300, when the LCD device is working in 3D mode, the constant current flow supplying chip 20 detects signal of the dimming control 50, and applies the second overvoltage protection level as overvoltage protection level of the backlight driving diagram according to this signal.

When the LCD device is working in 3D mode, the dimming control 50 is in high voltage level control. At this moment, the first switch K1 turns off in response to the low voltage level signal of this dimming control, and the second switch K2 turns on. The sixth pin of the voltage comparator 22 disconnects and the seventh pin conducts, thereby to perform voltage comparison using the second reference voltage 26 (2V) as reference voltage. The constant current flow supplying chip 20 collects voltage across the third resistor R3. When the voltage across the third resistor R3 is too high (i.e. overvoltage), the voltage comparator 22 disconnect the first FET Q1 through protection module, forcing the driving voltage of LED series circuit 10 to lower, thereby to protect.

The second reference voltage 26 is higher than the first reference voltage 28, thereby the overvoltage protection level can be lowered, components such as transformer of the circuit can be protected.

Accordingly, the present invention provides an overvoltage protection method of a backlight driver. The present invention conducts different reference voltage to compare voltage through detecting signals of dimming control, thereby setting up different overvoltage protection level respectively for 2D and 3D modes. Therefore, the present invention lowers the overvoltage protection level in 2D mode, and avoids abrupt power augment in 2D mode under unusual condition so as to prolong the lifetime of components in circuit such as transformers.

Those skilled in the art will readily observe that numerous modifications and alterations of the device may be made while retaining the teachings of the invention.

Accordingly, the above disclosure should be construed as limited only by the metes and bounds of the appended claims.

What is claimed is:

1. An overvoltage protection method for a backlight driver, comprising following steps:

Step 100: providing a liquid crystal display (LCD) device having 2D and 3D modes, comprising a backlight driver comprising a constant current supplying chip and a dimming control coupled to the constant current supplying chip, the constant current supply chip applying a first overvoltage protection level and a second overvoltage protection level as a overvoltage protection level, and the second overvoltage protection level being higher than the first overvoltage protection level;

Step 200: detecting a signal of the dimming control by using the constant current flow supplying chip, and applying the first overvoltage protection level as the overvoltage protection level of the backlight driver based on the signal of the dimming control when the LCD device is working in the 2D mode; and Step 300: detecting the signal of the dimming control by using the constant current flow supplying chip, and applying the second overvoltage protection level as the overvoltage protection level of the backlight driver based on the signal of the dimming control when the LCD device is working in the 3D mode.

2. The overvoltage protection method for the backlight driver according to claim 1, wherein the backlight driver further comprises: a power module, an inductance coupled to the power module, a voltage dividing module, a rectifying diode coupled between the inductance and the voltage dividing module, a light emitting diode (LED) series circuit coupled to the rectifying diode, a first field effect transistor (FET) coupled to the inductance, a first resistor coupled to the first FET, a second FET coupled to the LED series circuit, and a control source coupled to the second FET, the second FET, the voltage dividing module and the first resistor are all coupled to ground, and the constant current supplying chip is coupled to the voltage dividing module.

3. The overvoltage protection method for the backlight driver according to claim 2, wherein the voltage dividing module comprises a second resistor and a third resistor series-connected, and the constant current supplying chip is coupled to a common end of the second and the third resistor.

4. The overvoltage protection method for the backlight driver according to claim 3, wherein the first FET comprises a first gate coupled to the constant flow supplying chip, a first drain coupled to the inductance, and a first source coupled to the first resistor.

5. The overvoltage protection method for the backlight driver according to claim 2, wherein the second FET comprises a second gate coupled to the control source, a second drain coupled to the LED series circuit, and a second source coupled to the ground.

6. The overvoltage protection method for the backlight driver according to claim 4, wherein the constant flow supplying chip comprises a first pin coupled to the first gate of the first FET, a second pin coupled to a common end of the second and third resistors and a third pin coupled to the dimming control.

7. The overvoltage protection method for backlight driver according to claim 6, wherein the constant flow supplying chip comprises a protection module coupled to the first pin, a first switch, a second switch, a first reference voltage, a second reference voltage and a voltage comparator coupled to the protection module, the voltage comparator comprises a fourth pin coupled to the protection module, a fifth pin coupled to the second pin, a sixth pin coupled to the first reference voltage via the first switch, and a seventh pin coupled to the second reference voltage via the second switch.

8. The overvoltage protection method for backlight driver according to claim 7, wherein the first switch turns on while the second switch turns off when the signal of dimming control is at a low voltage level, and the first switch turns off while the second switch turns on when the signal of dimming control is at a high voltage level.

9. The overvoltage protection method for backlight driver according to claim 7, wherein the first reference voltage is lower than the second reference voltage.

10. The overvoltage protection method for backlight driver according to claim 9, wherein the first reference voltage is 1.5V, and the second reference voltage is 2V.

11. An overvoltage protection method for a backlight driver, comprising following steps:
Step 100: providing a liquid crystal display (LCD) device having 2D and 3D modes, comprising a backlight driver comprising a constant current supplying chip and a dimming control coupled to the constant current supplying chip, the constant current supply chip applying a first overvoltage protection level and a second overvoltage protection level as a overvoltage protection level, and the second overvoltage protection level being higher than the first overvoltage protection level;
Step 200: detecting a signal of the dimming control by using the constant current flow supplying chip, and applying the first overvoltage protection level as the overvoltage protection level of the backlight driver based on the signal of the dimming control when the LCD device is working in the 2D mode; and
Step 300: detecting the signal of the dimming control by using the constant current flow supplying chip, and applying the second overvoltage protection level as the overvoltage protection level of the backlight driver based on the signal of the dimming control when the LCD device is working in the 3D mode;
wherein the backlight driver further comprises: a power module, an inductance coupled to the power module, a voltage dividing module, a rectifying diode coupled between the inductance and the voltage dividing module, a light emitting diode (LED) series circuit coupled to the rectifying diode, a first field effect transistor (FET) coupled to the inductance, a first resistor coupled to the first FET, a second FET coupled to the LED series circuit, and a control source coupled to the second FET, the second FET, the voltage dividing module and the first resistor are all coupled to ground, and the constant current supplying chip is coupled to the voltage dividing module;
wherein the voltage dividing module comprises a second resistor and a third resistor series-connected, and the constant current supplying chip is coupled to a common end of the second and the third resistor;
wherein the first FET comprises a first gate coupled to the constant flow supplying chip, a first drain coupled to the inductance, and a first source coupled to the first resistor;
wherein the second FET comprises a second gate coupled to the control source, a second drain coupled to the LED series circuit, and a second source coupled to the ground;
wherein the constant flow supplying chip comprises a first pin coupled to the first gate of the first FET, a second pin coupled to a common end of the second and third resistors and a third pin coupled to the dimming control;
wherein the constant flow supplying chip comprises a protection module coupled to the first pin, a first switch, a second switch, a first reference voltage, a second reference voltage and a voltage comparator coupled to the protection module, the voltage comparator comprises a fourth pin coupled to the protection module, a fifth pin coupled to the second pin, a sixth pin coupled to the first reference voltage via the first switch, and a seventh pin coupled to the second reference voltage via the second switch;
wherein the first switch turns on while the second switch turns off when the signal of dimming control is at a low voltage level, and the first switch turns off while the second switch turns on when the signal of dimming control is at a high voltage level;
wherein the first reference voltage is lower than the second reference voltage; and
wherein the first reference voltage is 1.5V, and the second reference voltage is 2V.

\* \* \* \* \*